United States Patent [19]

Gielow et al.

[11] Patent Number: 4,569,289

[45] Date of Patent: Feb. 11, 1986

[54] AIR FLOW GUIDE STRUCTURE FOR OPEN TOP RAILWAY CAR

[75] Inventors: Robert L. Gielow, Farmington; James C. Paul, Ypsilanti, both of Mich.

[73] Assignee: Pullman Standard Inc., Chicago, Ill.

[21] Appl. No.: 584,016

[22] Filed: Feb. 27, 1984

[51] Int. Cl.[4] ............................................. B62D 35/00
[52] U.S. Cl. .................... 105/2 R; 105/406 R; 296/1 S
[58] Field of Search ............ 105/406 R, 409, 420, 105/2 R; 296/1 S, 217; 298/1 R; 180/1 FV, 313

[56] References Cited

U.S. PATENT DOCUMENTS

| | | | |
|---|---|---|---|
| 3,509,827 | 5/1970 | Sutter | 105/409 |
| 3,819,222 | 6/1974 | Woodard | 296/1 S |
| 4,022,508 | 5/1977 | Kirsch et al. | 296/1 S |
| 4,079,984 | 3/1978 | Powell | 296/1 S |
| 4,269,444 | 5/1981 | Emony | 296/1 S |
| 4,361,097 | 11/1982 | Jones et al. | 105/406 R |
| 4,457,550 | 7/1984 | Gielow et al. | 296/1 S |
| 4,465,154 | 8/1984 | Hinderks | 296/1 S |
| 4,475,759 | 10/1984 | Wine | 296/1 S |

Primary Examiner—Raymond A. Nelli
Attorney, Agent, or Firm—Richard J. Myers & Assoc., Ltd.

[57] ABSTRACT

Air flow guide members at each end of the cargo carrying structure of an open top gondola type railway car, together with rounded transition or corner surfaces on the exterior of the car and aerodynamically shaped and oriented cross braces within the car serve to reduce aerodynamic drag on the car as it is moved. Additionally, to further enhance the energy efficiency of the car, the cargo carrying structure is formed predominately of a light weight weldable metal, such as an aluminum alloy, and the side support members are placed on the interior wall of each side to provide a smooth, minimized air flow resistant side surface.

23 Claims, 12 Drawing Figures

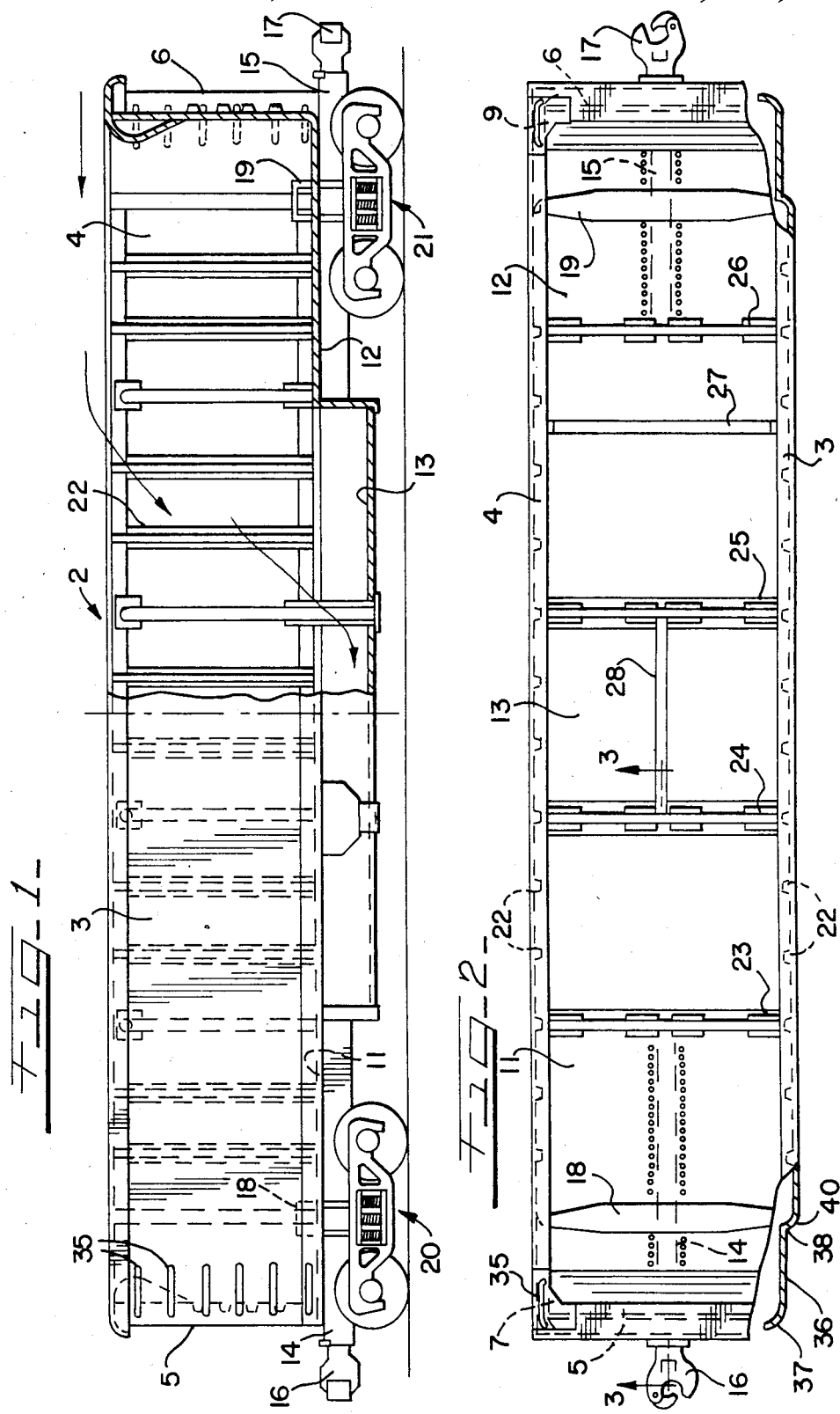

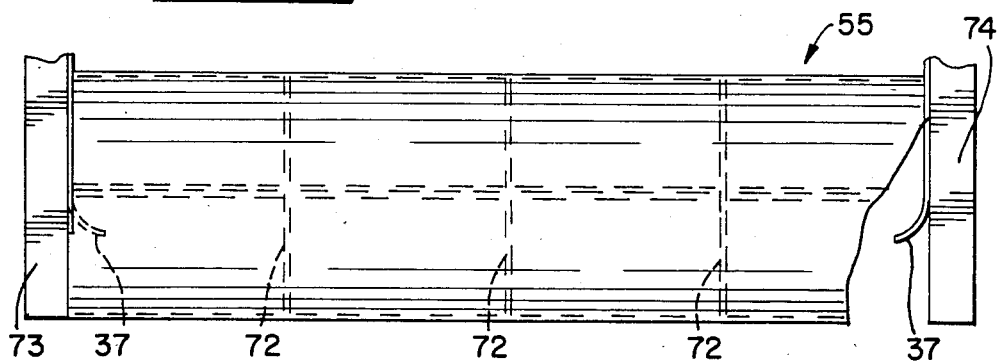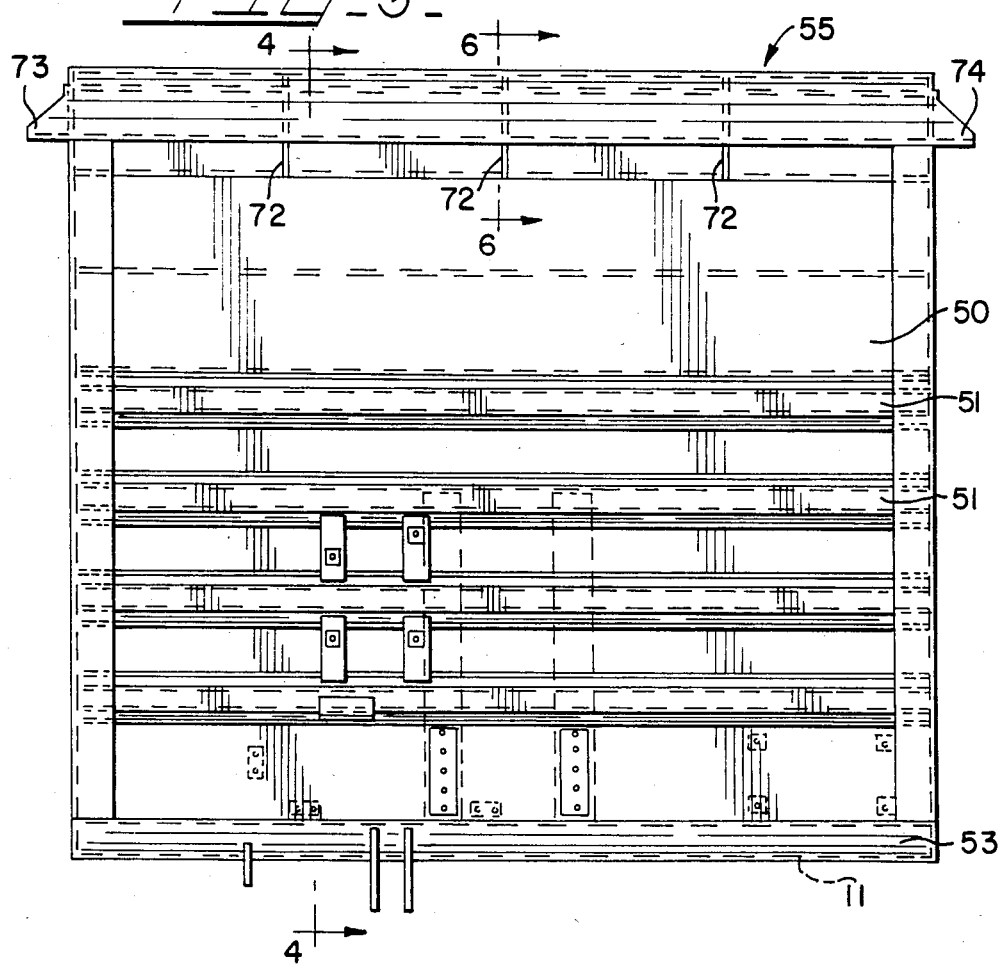

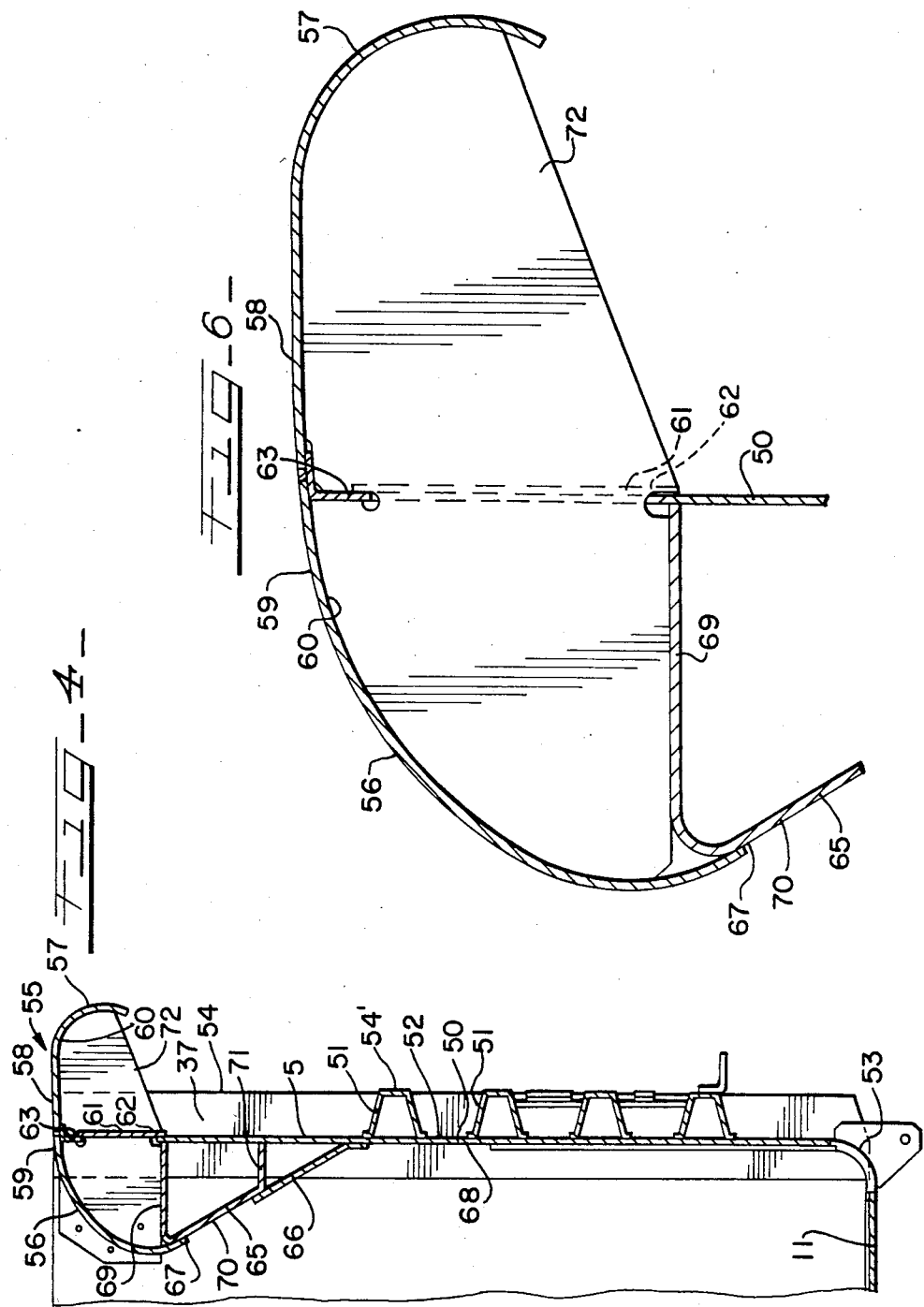

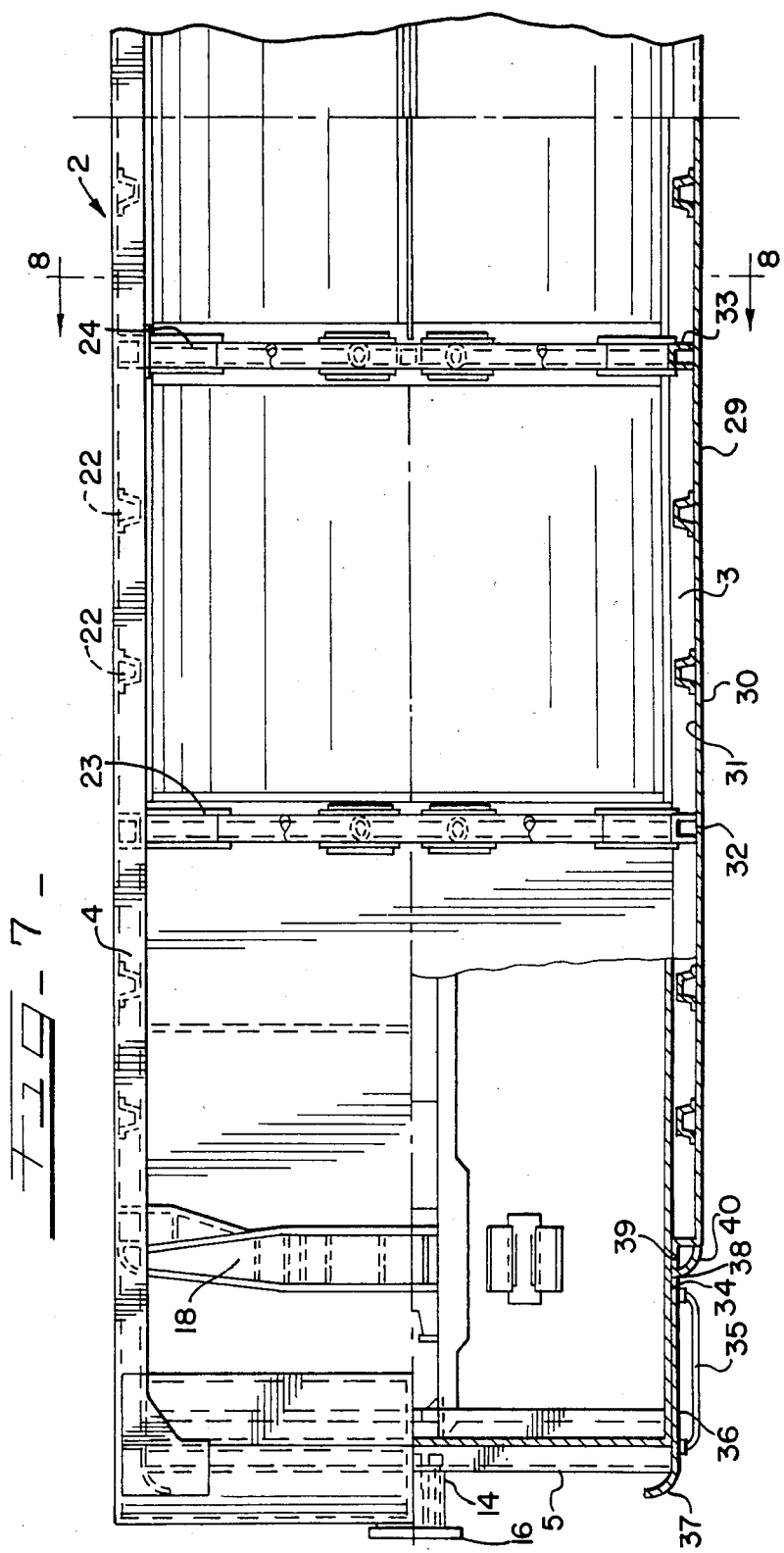

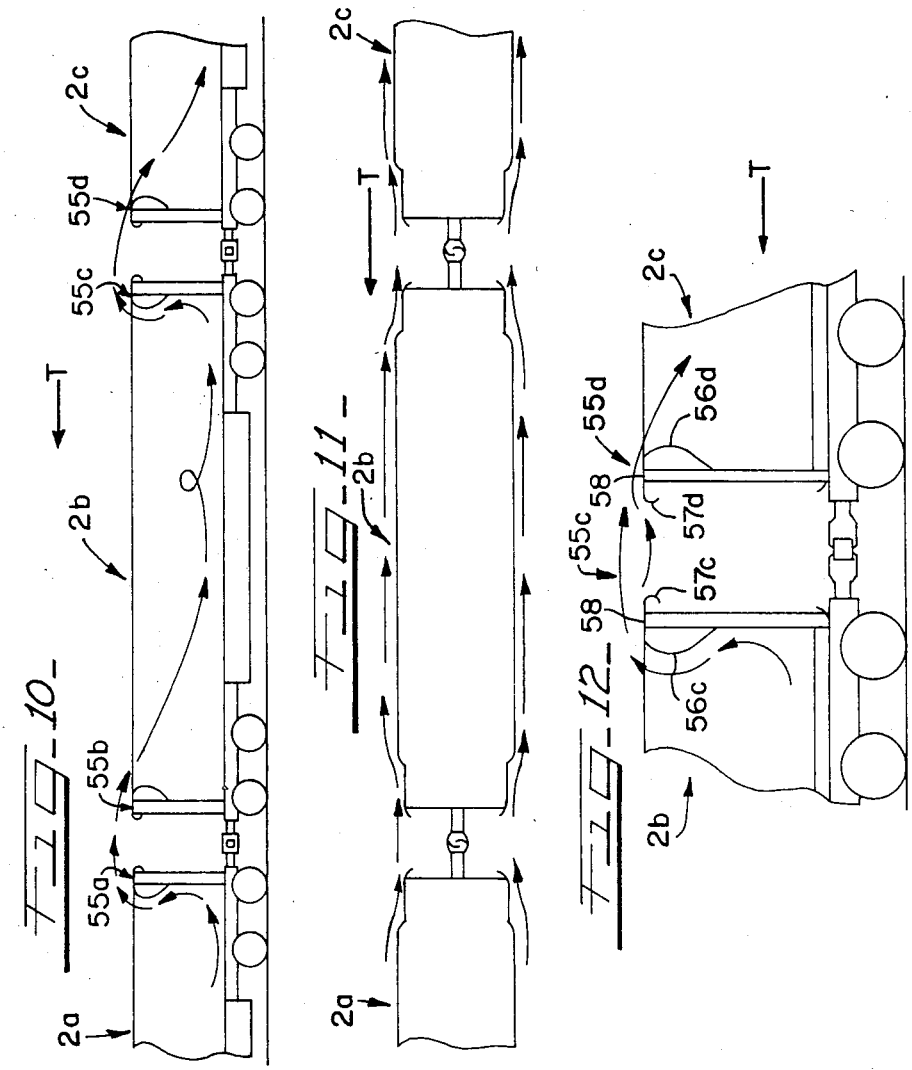

AIR FLOW GUIDE STRUCTURE FOR OPEN TOP RAILWAY CAR

BACKGROUND OF THE INVENTION

1. Related Patents

This application is related to U.S. patent application Ser. No. 596,968 filed Apr. 5, 1984 entitled "LIGHT WEIGHT GONDOLA TYPE RAILWAY CAR"; U.S. patent application Ser. No. 583,647 filed Feb. 27, 1984 entitled "AERODYNAMIC STRUCTURED RAILWAY CAR"; and U.S. patent application Ser. No. 597,125 filed Apr. 5, 1984 entitled "BOLSTER FOR RAILWAY CAR". Each of these applications has the same assignee as this application.

2. Field of the Invention

This invention relates to a light weight gondola type open top railway car having an aerodynamically configured structure to increase its energy efficiency during transit in each a loaded and unloaded condition.

3. Description of the Prior Art

Gondola type open top railway cars are typically formed into trains and used to haul bulk cargoes, such as coal, grains or mining ores. Due to the typical specialized nature of the cargo, gondola type cars are often used to form a train consisting of only gondola cars and the train, frequently comprised of one hundred or more gondola cars pulled by one or more locomotives, hauls coal from a source, such as a Montana or Wyoming mine, to a user, such as a utility in the Midwest. After being unloaded, as by each car in the train being serially tipped upside down and dumped at a dumping station, the same train is pulled empty back to the coal source to be loaded, as by "flood" loading while moving and then repeats the trip. Due to the great frequency of the trips made and distances traversed each trip, any energy saving, generally measured in terms of reduced fuel consumption, which can be gained by making the cars easier to pull can be significant.

Conventional cars, for purposes of durability due to the rough service conditions they are subjected to, have generally been constructed of steel arranged to provide strength and durability and decreased aerodynamic drag has generally not been a design criterion.

SUMMARY OF THE INVENTION

A high sided, open topped gondola type railway car is constructed of lightweight materials, such as aluminum. The car body is designed to be aerodynamically efficient and is provided with members and surfaces which decrease the aerodynamic drag on the car and consequently reduce the energy required to move the car. Airfoil members attached to the upper end walls of the car are generally only efficient when the car is unladen or empty whereas the aerodynamic drag reducing body design is generally effective under all transit conditions of the car.

BRIEF DESCRIPTION OF THE DRAWINGS

FIG. 1 is a partially cutaway side elevation view of a railway car of this invention;

FIG. 2 is a top plan view of the railway car shown in FIG. 1;

FIG. 3 is an enlarged end view of the railway car body shown in FIG. 1;

FIG. 4 is a cross sectional view of the car end shown in FIG. 3 as indicated by the section line 4—4;

FIG. 5 is a top view of the end of the car shown in FIG. 3;

FIG. 6 is an enlarged cross sectional view of the airfoil portion of the end of the car shown in FIG. 3 as indicated by the section line 6—6;

FIG. 7 is an enlarged top plan view of a portion of the car shown in FIG. 2;

FIG. 10 is a side elevation view of a railway car having the features of this invention serially connected to other similar cars;

FIG. 11 is a top plan view of FIG. 10; and

FIG. 12 is an enlarged side elevation view of two cars serially connected.

DETAILED DESCRIPTION OF THE PREFERRED EMBODIMENT

Figure 9:
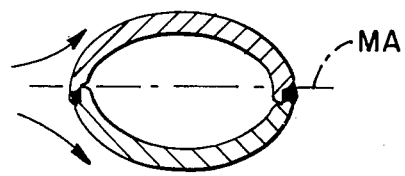
FIG. 9 is a cross sectional view of a strut member shown in FIG. 8, as indicated by the section line 9—9.

FIG. 1 shows, in a partially cutaway side elevation view, a gondola-type railway car 2 having an aerodynamic body construction. FIG. 2 is a top plan view of the open top gondola-type car shown in FIG. 1.

Referring to FIGS. 1 and 2, car 2 is comprised of a cargo carrying structure having a first side wall 3, a second side wall 4, a first or front end wall 5 and a second or rear end wall 6. The side walls and end walls are substantially rigidly affixed to each other at corners 7, 8, 9 and 10.

A bottom closure means, such as a first bottom closure and shear plate member 11, a second bottom closure and shear plate member 12 and a depressed or lowered bottom closure member, generally indicated as 13, are sealingly engaged with the wall members to provide a cargo carrying structure having a substantial cubic capacity.

Car 2 has a first stub center sill 14, and a second stub center sill 15. Connected to each stub center sill 14 and 15 is a conventional coupler, such as couplers 16 and 17, respectively, which enable each end of the car to be connected to an adjacent car at each of its ends. Couplers 16 and 17 will generally be of the type which enable the car to be tipped upside down for dumping while remaining coupled to a car at each end.

Car 2 has adjacent each end an internally constructed bolster, such as bolsters 18 and 19. Wheel truck assemblies, such as conventional truck assemblies 20 and 21 are engaged with a bolster and stub center sill to rollingly support the cargo carrying structure.

To rigidify the sides of the car a plurality of vertically extending side support members 22 are rigidly affixed, as by welding, to an interior surface portion of each of the side walls of sides 3 and 4 of car 2. To further rigidify the cargo carrying structure of the car 2 a plurality of crossridge assemblies, such as assemblies 23, 24, 25 and 26 are provided to rigidly engage the bottom closure portions 11, 12 and 13 to sides 3 and 4.

Additionally a minor or mini crossridge assembly 27 is provided to further reinforce a portion of bottom closure portion 13 and a longitudinally extending web type reinforcing assembly 28 is preferably provided between crossridge assemblies 24 and 25, as best shown in FIG. 2.

As best shown in FIG. 7 side 3 from which a top portion has been cutaway to improve clarity, car 2 has a wall member 29 formed of a smooth surface plate or sheet, preferably formed of a lightweight material, such as an extruded weldable aluminum alloy.

Wall member plate 29 has an outer surface 30 and an inner surface 31. Rigidly attached, as by welding to inner surface 31, are the plurality of vertically oriented side support members 22. Also attached to a portion of inner surface 31 of plate 29 are vertical crossridge support posts, such as posts 32 and 33, for crossridge assemblies 23 and 24, repectively. This construction, as just described above, is typical of each side wall assembly 3 and side wall assembly 4 of car 2 in which a smooth, low air flow resistant surface, such as exterior surface 30 of side plate 29 is exposed to air flowing along the car during movement of the car.

Adjacent end 5 of car 2 is a laterally inward offset side portion 34 of side assembly 3. Offset side portion 34 is typical of the wall construction at each of the corners 7, 8, 9 and 10 of car 2. Each corner wall portion is offset from a main wall assembly 3 or 4 to provide a location for a plurality of ladder rungs, such as ladder rung 35, to prevent the ladder rung from extending out beyond exterior surface 30 of plate 29 of wall 3. The maximum distance between the exterior surfaces of main walls 3 and 4, i.e., the overall width, of car 2, is limited by railroad industry standards. As shown in FIG. 7, offset wall portion 34 is comprised of a plate member having a smooth outer or exterior surface 36, a laterally inwardly curved vertically extending portion 37 and a second terminal end portion 38 which is rigidly engaged, such as by welding, to a vertically extending bolster post 39 having an exterior curved surface portion 40 which forms an airflow efficient transitional configuration between surface 36 of wall portion 34 and surface 30 of plate 29 of wall assembly 3.

The offset wall portion at each corner of the car 2 is substantially the same as just described for offset wall 34 except some offset walls may have more ladder rungs spaced along it than others, depending on whether the rungs are for purposes of a train crewman standing on the rungs or for purposes of climbing to the top of the car to visually inspect the interior of the cargo structure of the cars.

Figure 8:
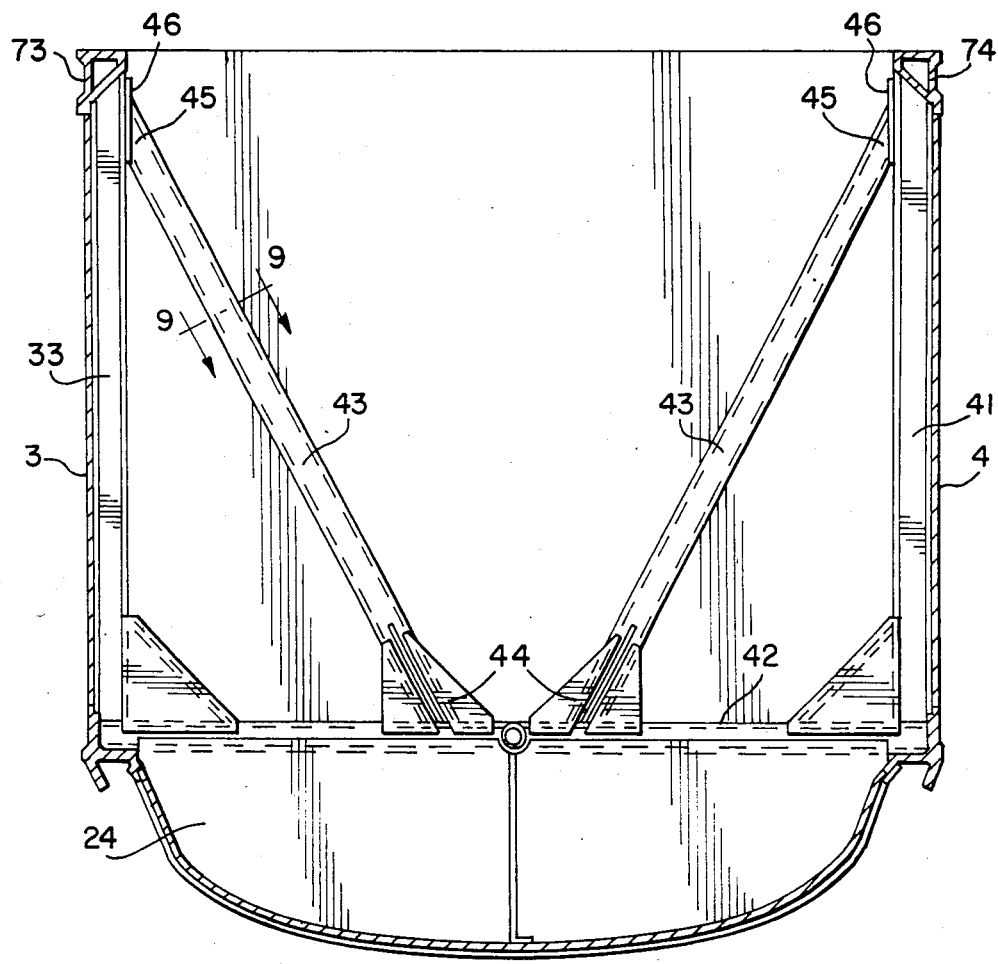
FIG. 8 is a cross sectional view of FIG. 7 as indicated by the section line 8—8.

Referring now to FIG. 8 in which the crossridge assembly 24 of FIG. 7 is shown, crossridge assembly 24 is comprised of crossridge vertical side post 33, a second crossridge vertical side post 41 affixed to side assembly 4, a substantially horizontal crossridge top chord member 42 which extends between a lower portion of each vertical posts 33 and 41 and a pair of diagonally extending support struts 43, each of which are rigidly engaged with member 42 adjacent a lower end portion 44. Each strut 43 diverges and extends vertically upwardly from its attachment to member 42 to have a second end portion 45 rigidly engaged to an inward facing surface of a vertical crossridge post 33 or 41 by being rigidly affixed to connective means, such as plates 46 which are welded, or otherwise rigidly engaged, with one of the posts 33 or 41.

As best shown in FIG. 9, each of the diagonal struts 43 has an elliptical cross section in which the major axis of each strut is positioned to be substantially parallel to the longitudinal axis of car 2. Having each of the two struts in each of the four crossridge assemblies 23, 24, 25 and 26 oriented to present a smooth minimum surface profile to air flow through car 2 in an unloaded position presents another significant decrease in aerodynamic drag of the car 2.

Referring now to FIGS. 3, 4 and 5 which show, respectively, an enlarged end, side cross section and top view of end 5 of car 2, end 5 is comprised of a vertically extending plate member 50 having a plurality of horizontally extending support members 51 affixed to its exterior surface 52. At a lower portion adjacent a bottom closure plate a curved connective member 53, is rigidly affixed to each a floor closure member and shear plate, such as member 11 and plate 50 of end wall 5. As shown in FIG. 4, the terminal end 54 of curved terminal portion 37 of the offset side wall is substantially coterminus with the exterior-most portions 54' of the end wall support member 51.

Affixed to the upper end portion or top portion of end wall 5 is an air flow guide means as airfoil assembly 55. Airfoil assembly 55 is comprised of an uppermost airfoil surface member having a first convex curved portion 56, a second convex curved portion 57 and a connective portion 58. The airfoil member formed by the curved portions has an exterior surface 59 and an interior surface 60.

The airfoil member is rigidly connected to an end, such as end wall 5, of car 2 by appropriate means, such as vertically upward extending member 61 which is welded at a lower end portion 62 to plate 52 of end wall 5 and at an upper end 63 to a connective member, such as angled aluminum member 64 which is rigidly attached, such as by welding to a portion of the interior surface 60 of the airfoil member.

Interior of the cargo carrying structure of car 2 a non-retaining cargo means, such as members 65 and 66, connects an end portion 67 of curved portion 56 to an interior surface 68 of plate 5, as best shown in FIG. 4.

Member 65 is comprised of a first substantially horizontal member 69, a sloping connective member 70 and a second horizontal member 71. Member 66 is rigidly engaged to and extends between sloped member 70 and surface 68 of plate 50 whereby members 66 and 67 serve to rigidly engage the airfoil with the end wall 5 and, because members 66 and 67 extend the width of the interior of the car, prevent cargo, such as coal, from becoming lodged beneath the airfoil.

Airfoil interior support means, such as support plates 72, are rigidly affixed to portions of interior surface 60 of the airfoil and to a portion of end wall 5 to further secure the airfoil to the car and rigidify the shape of the airfoil.

A pair of side wall top chord members 73 and 74, as shown in FIGS. 3, 5 and 8 are attached along the top of side walls 3 and 4, respectively, and extend along and are rigidly engaged with each side of the airfoil to further rigidly attach the airfoil assembly to the car 2.

An airfoil assembly 55, as shown in FIGS. 1 and 2, is placed on each end wall 5 and 6 of car 2, the airfoils are positioned substantially as mirror images of each other and, as the airflow features are substantially identical at each end 5 and 6 of the car and at all the bolster posts 39, the car may be pulled in either direction with substantially the same air flow characteristics.

All the aerodynamic drag-reducing curved surfaces of this invention are designed to cause the air flowing over these surfaces to flow, or tend to flow, conformingly or non-separatingly substantially along the surface of the curve in a substantially smooth, or non-turbulent, manner to maintain or increase lip suction to reduce aerodynamic drag or, under some condition, provide a net force which induces the car in the direction of travel. FIG. 10 shows in a side elevation view a plurality of cars 2 serially connected to each other and FIG. 11 is a top plan view of FIG. 10. Thus arranged, such a plurality of cars couplingly engaged and connected to a force means, such as locomotive, form a cargo carrying unit made up of a plurality of interacting modules or cars.

Referring to FIGS. 10, 11 and 12, flow arrows are used to indicate the typical flow of air with respect to cars 2 as the cars are pulled in the direction of travel T indicated at a constant speed along a substantially horizontal railway track. References to front and rear or forward and rearward should not be construed as limitations, but merely as terms to show or explain directions of movements. As shown in FIG. 10, the air typically flows over the airfoil assembly designated 55a mounted on the rear end wall 6 of one car 2a and flows over the airfoil assembly designated 55b affixed to the upper portion of what serves as the front end wall 5 of the adjacent car 2b in the indicated direction of travel T. The air flow thus typically descends downwardly into the empty cargo space of the car and flows through the cargo space around and over the elliptical, diagonal struts (shown in FIGS. 1, 2, 8 and 9) and impinges on the interior surface of the rear end wall 6 which has an airfoil assembly designated 55c (see FIG. 10) affixed to its top portion. The impinging air forms a stagnation point or area on the bluff back or rear wall 6 of said adjacent car and attempts to radiate outwardly from this point or area. However, due to the bottom closure, side walls 3 or 4 and end wall 6 the air is forced to flow upward over the air flow and cargo funnelling connection means, designated 65 and 66 on FIG. 4, and over the leading edge surface and connective surfaces of the airfoil assembly or member 55c. At this point some of the air flow will separate from the surface of the airfoil assembly and flow to the next, or leading airfoil 55d of the next car 2c. However, some of the air, as best shown by the lower flow arrow between the cars in FIG. 12, will conformingly or non-separately flow along the trailing or second convex curved portion 57c of the airfoil assembly 55c and flow downwardly between the cars 2b and 2c where at least portion of it will contact what is now, for airfoil assembly 55d, the leading or second convex curved portion 57d, and conformingly or non-separatingly flow over and along the top surface of airfoil assembly 55d and commence descending into the cargo space to repeat the cycle of flow at the next end wall. To be effective at reasonable forward velocities or speeds, such as above 15 mph., or second convex curved portions 57c and 57d should be of a size at least comparable to an arc of a circle having a 6-inch radius and the first convex curved portions 56c and 56d (see FIG. 12) should be comparable to an arc of a circle having a radius of at least 3 inches. The minimum dimensions are provided as indicative as the curve 56 of airfoil is, as best shown in FIG. 6, not a regular arc of a circle, but rather a multi-radius or developed curve.

For purposes of illustration only, one preferred embodiment of assembly 55 has a dimension along member 61 between member 69 and that portion of interior surface 60 to which member 63 is affixed of about 14 inches. Additionally the leading edge curve 56 at its furthest point away from member 61 is about 14 inches along a line substantially parallel to member 69. The dimension between member 61 and the surface of leading edge 56 along a line substantially parallel to member 69 at a point substantially 7 inches above member 69 is about 11.7 inches. The surface of trailing edge 57 is, at its furthest point from member 61, about 17 inches and is comprised of an arc of a circle having a radius of about 5.8 inches with the upper portion smoothly merging with transition surface 58.

In the top plan view of FIG. 11 air flow indicating arrows are used to indicate the typical flow of a majority of the air with respect to the sides of the cars when they are serially arranged as shown. As indicated by the arrows the air tends to flow smoothly, or non-turbulently, along the sides of the cars, flow conformingly along the curved surfaces of the bolster posts, along the offset side wall where a portion of the air flows to the offset side wall of the next car and some of the air, not indicated by flow arrows, will undoubtedly flow along the trailing curve of the side wall and impinge on various portions of the exterior surface of the next end wall. Here again, as with the interior surface of a back end wall, the air will form a stagnation point or area. However, due to the absence of the side walls and bottom closure, some of the air will radiate laterally outward and flow over the vertically extending convex curved surface connecting the end wall to each of the side walls, some of the air will flow upward and along the convex curved surface of the airfoil member and some will flow downward and over the convex curved surface 53 connecting the lower portion of the end wall to the bottom closure. Due to the sizes of these convex curved surfaces, all being at least as great an arc of a circle having a radius of 3 inches, the air will conformingly or non-separatingly flow onto the adjacent smooth surfaces, particularly the smooth exterior surfaces of the side walls, to reduce the turbulence which increases aerodynamic drag.

Generally speaking, surfaces having curves of less than 3 inches in radius are ineffective in reducing aerodynamic drag at the velocities or speeds at which railway cars of this type travel.

What is claimed is:

1. A railway car having a cargo carrying structure having a bottom closure structure and a pair of side walls and forward and rearward end walls engaged with and extending upwardly from said bottom closure structure for forming an open top space for containing cargo and means for guiding air flow being engaged with an upper portion of said forward end wall for guiding air flow through said space for reducing aerodynamic drag on said car, and said means for guiding air flow including forwardly extending means extending forwardly of the forward end wall for guiding air flow upward over the forward end wall when the railway car is moved in a forwardly direction and rearwardly extending means extending rearwardly of the forward wall for guiding air flow downward into the cargo space rearward of the forward end wall when the railway car is moved in a forwardly direction whereby turbulence and resulting aerodynamic drag created by the forward wall are reduced, and said rearwardly extending means for guiding airflow downward into the cargo space being adapted to guide air flow upward over the forward end wall when the railway car is moved in a rearward direction for reducing aerodynamic drag resisting movement in the rearward direction.

2. The invention as defined in claim 1 together with a means for guiding air flow engaged with an upper portion of said rearward end wall for guiding air flow over the rearward end wall during forward and rearward movements of the car for reducing aerodynamic drag akin to that afforded by the first mentioned means for guiding air flow.

3. The invention as defined in claim 1 in which said rearwardly extending means has a trailing edge portion facing toward said rearward end wall.

4. The invention as defined in claim 1 in which said forwardly extending means is comprised of a convex curved leading edge portion facing forwardly, and said means for guiding air flow including an intermediate air flow guiding portion connected with said leading edge portion and extending rearwardly and generally horizontally therefrom and said rearwardly extending means comprising a trailing edge portion connected with said intermediate air flow guiding portion distal from said leading edge portion.

5. The invention as defined in claim 1 together with cargo flow and air flow guiding means engaged with said rearwardly extending means and an inner portion of said forward end wall for preventing cargo contained in said space from being trapped in said space by said portion of said air flow guiding means.

6. The invention as defined in claim 1 in which said means for guiding airflow is comprised of a structure having a substantially continuous generally convex curved outer portion extending longitudinally with respect to said car and said convex portion having a part being substantially perpendicular to said upper portion of said forward end wall.

7. The invention according to claim 1 and
said forwardly extending means for guiding air flow comprising an airflow member connected with the upper end of the forward end wall and extending forwardly and downwardly therefrom in a convex curve.

8. The invention according to claim 7 and
said airflow member having a lower terminal end being spaced from said end wall.

9. The invention according to claim 7 and
reinforcing means attached to said forward end wall and said airflow member for supporting said airflow member in said convex curve.

10. The invention according to claim 1 and
said rearwardly extending means for guiding air flow comprising a first airflow member connected with the upper end of the forward end wall and extending rearwardly and downwardly therefrom in a convex curve.

11. The invention according to claim 10 and
a cargo flow and air flow guiding member connected with a lower portion of said first airflow member and a portion of said forward end wall for preventing cargo contained in said cargo space from being trapped in said space by said first airflow member.

12. The invention according to claim 10 and
said forwardly extending means for guiding air flow including a second airflow member connected with the first airflow member and
reinforcing means connected to the forward end wall and the first and second air flow members for supporting said air flow guiding means.

13. The invention according to claim 1 and
the rearward end wall having further means for guiding air flow being substantially symmetrical to the first means for guiding air flow for reducing aerodynamic drag on the car during movement in a forward direction and during movement in a rearward direction.

14. In a railway car assembly comprising forward and rearward railway cars supported for forward and rearward movement, said forward car having a rearward end wall supported thereon and said rearward car having a forward end wall supported thereon, the upper portion of the rearward end wall of the forward car being substantially at the same height as the upper portion of the forward end wall of the rearward car, the rearward end wall of the forward car and the forward end wall of the rearward car defining an intervening space therebetween, the improvement comprising:
first air flow means engaging the upper portion of the rearward end wall of the forward car for guiding air flow across said intervening space between the cars when the railway car assembly is drawn in a forwardly direction, and
second air flow means engaging the upper portion of the forward end wall of the rearward car and being adapted to guide the air flow directed across the intervening space by the first air flow guiding means to pass substantially smoothly over the forward end wall of the rearward railway car for reducing the drag in the railway car assembly during forward movement.

15. The invention according to claim 14 and
each of the air flow guiding means comprising a convexly curved air flow member extending into said intervening space and downwardly from the respective end walls.

16. A railway car having a bottom portion and a forward end wall, a rearward end wall, and a pair of side walls extending upwardly from the bottom portion and defining therewith an open top cargo space, the improvement comprising:
forward air flow guide means on the upper portion of the forward end wall and
rearward air flow guide means on the upper portion of the rearward end wall;
each of said air flow guide means having a convexly curved airfoil member being connected with the upper portion of the end wall and extending curvingly downward and inward of the railway car therefrom whereby when the car is moved forwardly, the forward air flow guide means smoothly draws air flow downwardly into the cargo space and the rearward air flow guide means smoothly guides air flow out of the space and over the rearward end wall, and when the car is moved rearwardly, the rearward air flow guide means smoothly draws air flow into the cargo space and the forward air flow guide means smoothly guides air flow out of the space and over the forward end wall, thereby reducing aerodynamic drag of the car in forward and rearward movement.

17. The invention according to claim 16 and
each of the air flow guide means having an outer airfoil portion connected with the upper portion of the end wall and extending outwardly of the railway car from the end wall,
each of said outer airfoil portions curving downwardly from the upper portion for guiding air flow smoothly over the end wall with reduced turbulence and aerodynamic drag.

18. The invention according to claim 17 and
each of the airflow guide means including an air flow and cargo flow member connected with the airfoil member and the end wall for preventing entrappment of cargo in the cargo space.

19. In a railway car having a floor member and a pair of spaced apart end walls forward and rearward ends and an end wall extending upwardly from the floor member, the end walls and the floor member defining therebetween an open top cargo space, an air flow guide structure connected with the upper end of the end wall, the air flow guide structure comprising:
- a substantially flat top portion being connected to the upper end of the end wall and having a forward end and a rearward end;
- a first airfoil portion connected to the rearward end of the top portion and extending curvingly rearwardly and downwardly therefrom for guiding air flow smoothly over the end wall when the car is moved in a rearward direction to reduce aerodynamic drag of the railway car;
- a second airfoil portion connected to the forward end of the top portion and extending curvingly forward and downward therefrom for guiding air flow smoothly into the cargo space when the car is moved in a rearward direction to reduce aerodynamic drag;
- said second airfoil portion having a lower end spaced from the end wall; and
- an airflow and cargo guide member connected to the lower end of the second airfoil portion and to the end wall for guiding air flow smoothly upwardly from the cargo space over the second airfoil portion and over the end wall when the car is moved forwardly and for preventing cargo being trapped between the second airfoil portion and the end wall.

20. The invention according to claim 18 and
the curve of the first airfoil portion being substantially an arc of a circle having a radius of approximately 3 inches.

21. The invention according to claim 18 and
the curve of the second airfoil portion being substantially an arc of a circle having a radius of approximately 6 inches.

22. The invention according to claim 7 and
said rearwardly extending means for guiding air flow comprising a further airflow member connected with the upper end of the forward end wall and extending rearwardly and downwardly therefrom in a convex curve.

23. The invention according to claim 22 and
in which said means for guiding airflow is comprised of a structure having a substantially continuous generally convex curved outer portion extending longitudinally with respect to said car and said convex portion having a part being substantially perpendicular to said upper portion of said forward end wall.

* * * * *